United States Patent [19]

Sasaki

[11] 4,295,032
[45] Oct. 13, 1981

[54] PROCESS FOR BALANCING A CRANKSHAFT

[75] Inventor: Takeshi Sasaki, Tokorozawa, Japan

[73] Assignee: Honda Giken Kogyo Kabushiki Kaisha, Tokyo, Japan

[21] Appl. No.: 100,876

[22] Filed: Dec. 6, 1979

[30] Foreign Application Priority Data

Dec. 11, 1978 [JP] Japan ................... 53/151933

[51] Int. Cl.³ .................... B23K 9/04; G01M 1/16
[52] U.S. Cl. ......................... 219/137 R; 73/469; 219/137.71
[58] Field of Search ................. 219/137 R, 137.71; 73/66, 468, 469, 470, 460

[56] References Cited

U.S. PATENT DOCUMENTS

1,489,699  4/1924  David ................... 219/137 R

FOREIGN PATENT DOCUMENTS

40-10674  5/1965  Japan.

*Primary Examiner*—C. C. Shaw
*Attorney, Agent, or Firm*—Haseltine & Lake

[57] ABSTRACT

A process for balancing a crankshaft having pin portions and associated balancing weight parts which counterbalance the pin parts comprising welding masses to the balancing weight parts to compensate for unbalance of the crankshaft. The welding takes place after the crankshaft has been heat treated. The weld masses are directly formed on opposite sides of peripheral surfaces of the balancing weight parts without any preliminary formation of grooves in the peripheral surfaces for the weld masses.

1 Claim, 3 Drawing Figures

PROCESS FOR BALANCING A CRANKSHAFT

FIELD OF THE INVENTION

This invention relates to a process for balancing a crankshaft, chiefly for an internal combustion engine.

PRIOR ART

A process for balancing a crankshaft, that is, for compensating for any unbalance thereof is known in which the peripheral surfaces of respective balancing weight parts of the crankshaft are drilled to form holes in correspondence with the degree of unbalance of the shaft.

This process is disadvantageous in that the drilling must be effected prior to heat treatment of the shaft, and consequently, the shaft is subject to deformation by the subsequent heat treatment which again results in an unbalance of the shaft. Thus, it is difficult to balance the shaft with high precision.

Another process of this kind is known in which pads are applied to the peripheral surface of a crankshaft by a soldering operation, the pads of solder corresponding to the degree of unbalance of the shaft. This process is also disadvantageous in that solder is, in general, liable to be easily separated and therefore, prior to the soldering it is necessary to form grooves in the respective portions to which the solder is applied. This causes this process to become troublesome.

SUMMARY OF THE INVENTION

An object of the invention is to provide a process for balancing a crankshaft which is free from the disadvantages in the prior art.

In accordance with the invention, the peripheral surfaces of respective balancing weight parts of a crankshaft are built-up with masses or paddings by welding, in an amount corresponding to the degree of unbalance of the shaft.

DETAILED DESCRIPTION

Figure 1:
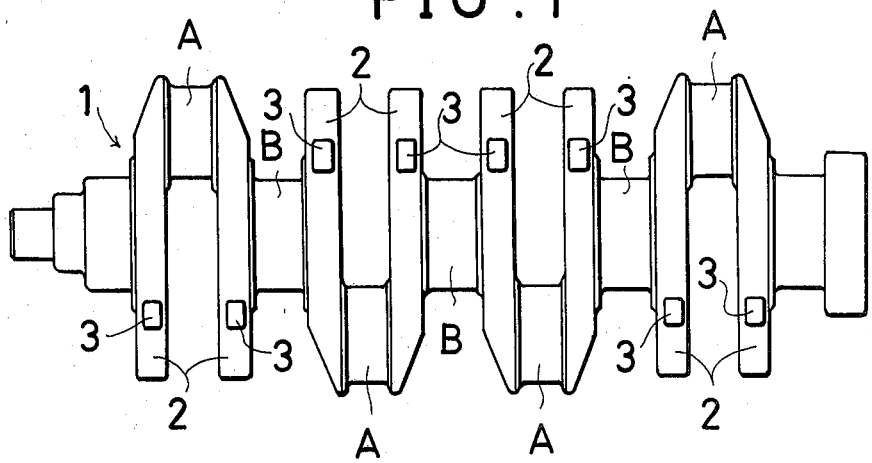
FIG. 1 is a side view of one embodiment of a crankshaft produced according to the process of this invention.
Figure 2:
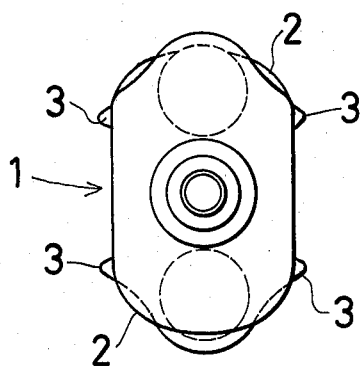
FIG. 2 is a front view of the crankshaft.

Referring to the drawing, therein is seen a crankshaft 1 comprising pin portions A, journal portions B and pairs of balancing weight portions 2, each pair counterbalancing a respective pin portion 2. Each weight portion 2 is subjected, at both sides of its peripheral surface to a build-up welding to form weld masses or paddings 3 thereon in an amount which corresponds to the degree of unbalance of the crankshaft. The balanced shaft 1 is shown in FIGS. 1 and 2.

Figure 3:
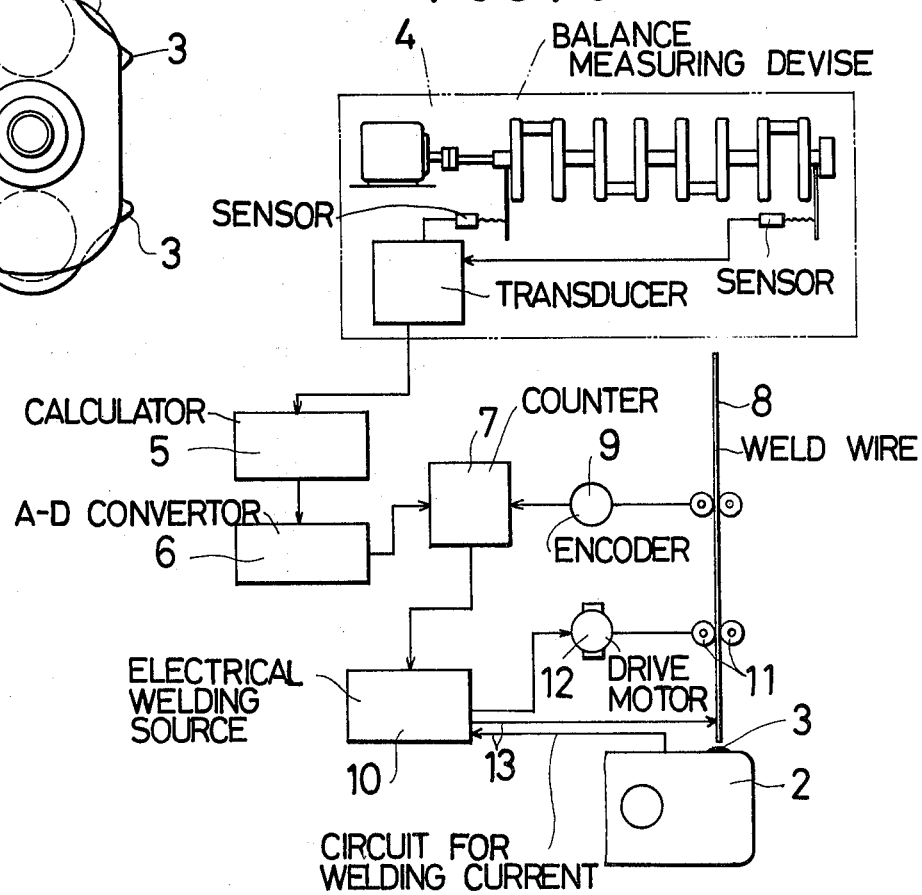
FIG. 3 is a diagrammatic illustration of a control system for carrying out the process of the invention.

As shown in FIG. 3, the degree of unbalance of crankshaft 1 is determined by an electronic balance measuring device 4 of conventional construction including sensors which detect unbalance and a transducer connected to the sensors to produce an electrical output signal. The output signal from device 4 is fed through a calculator 5 and an A-D convertor to a counter 7, and the output of the counter 7 energizes an electric welding source 10 which, in turn, energizes a circuit for welding current 13 and an electric motor 12 for driving feed rollers 11 for feeding the welding core wire 8. The welding core wire 8 moves longitudinally through sensing elements of an encoder 9 having an output connected to the counter 7, the output signal of the encoder 9 being operative to return the counter to null condition at the time an appropriate length and thus weight of weld wire has been fed by the rollers 11, at which time the motor 12 is deenergized by the welding source 10 and the circuit 13 for welding current is deenergized. Thus, the feed of the welding core wire 8 is so controlled that the amount thereof which is fed corresponds to the detected unbalance value, and the weld padding 3 of such amount can be formed. In this case, the welding is a Mig welding (inert gas shielded metal arc welding) or a Tig welding, and is carried out in a spatterless condition. The details of welding are well known to those skilled in the art and require no further elaboration.

Thus, according to the invention, the peripheral surfaces of respective balancing weight parts 4 of the crankshaft 1 are built-up with welded paddings 3 in correspondance with the degree of unbalance of the shaft. By virtue of this arrangement, the build-up welding can be carried out on the shaft after the shaft has been subjected to a heat treatment operation and any resultant deformation from the heat treatment is then corrected. As a consequence, the foregoing disadvantage in the case of conventional drilling is overcome and additionally the paddings are strong in bonding and previous grooving operations are not required, so that the disadvantages in the conventional soldering process are also overcome. Furthermore, a high precision compensation is obtained simply and easily in accordance with the invention.

What is claimed is:

1. In a process for balancing a crankshaft having pin portions and associated balancing weight parts counterbalancing said pin portions, and which includes the step of welding masses of welding wire to the balancing weight parts to compensate for imbalance of the crankshaft, the improvement comprising the steps of:

electronically sensing and obtaining an analog signal of the extent of imbalance in said crankshaft,
 converting said analog signal to digital form,
 feeding said digital signal to an electronic counter to count-up said counter,
 employing said counter when other than in null condition to activate a welding current supply and to activate a feed for welding wire,
 obtaining a digital signal representative of the length and thus of the weight of the welding wire fed by said feed, and
 supplying said signal representative of the length of the welding wire to said counter to progressively count-down said counter to a null condition and to deactivate said welding current supply and said feed.

* * * * *